No. 12,343. REISSUED MAY 9, 1905.

J. I. LITCHFIELD.

INKING APPLIANCE.

APPLICATION FILED DEC. 13, 1904.

Witnesses

J. L. Mercketu

H. J. Doyle

Inventor

J. I. Litchfield by

Wright, Brown & Quinby

Attorneys

PHOTO LITHOGRAPHED BY SACKETT & WILHELMS LITHO. & PTG. CO. NEW YORK

No. 12,343. Reissued May 9, 1905.

UNITED STATES PATENT OFFICE.

JESSE I. LITCHFIELD, OF WOLLASTON, MASSACHUSETTS.

INKING APPLIANCE.

SPECIFICATION forming part of Reissued Letters Patent No. 12,343, dated May 9, 1905.

Original No. 733,491, dated July 14, 1903. Application for reissue filed December 13, 1904. Serial No. 236,774.

*To all whom it may concern:*

Be it known that I, JESSE I. LITCHFIELD, of Wollaston, in the county of Norfolk and State of Massachusetts, have invented certain new and useful Improvements in Inking Appliances, of which the following is a specification.

This invention relates to appliances for inking rubber and other printing-stamps, and particularly to that class of inking apparatus in which an absorbent pad is located upon a base, the base being constructed to hold an accumulation of ink below the pad, so that the pad will be kept saturated with ink for a considerable length of time.

The invention has for its object to provide an appliance of this character which shall be capable of use without replenishing the supply of ink for a greater length of time than heretofore and in which the pad will not be liable to become supersaturated with ink and will therefore not be liable to excessively ink a stamp pressed against its surface.

The invention consists in the improvements which I will now proceed to describe and claim.

Figure 1:
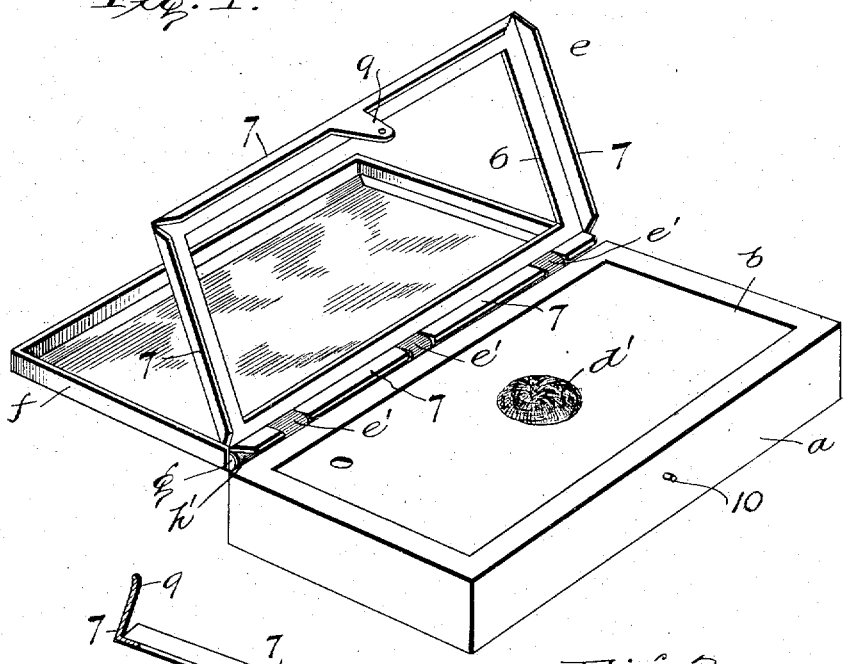
Figure 2:
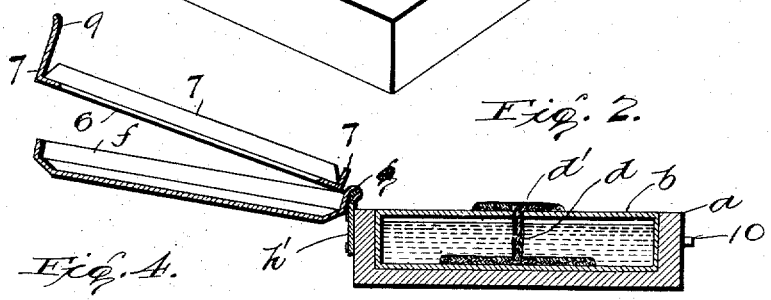
Figure 4:
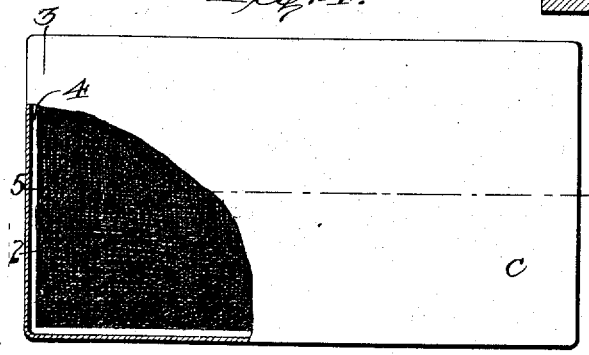
Figure 3:
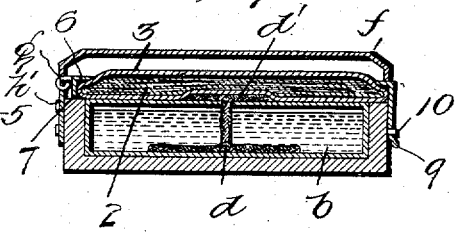
Figure 6:
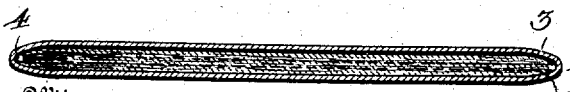
Figure 5:
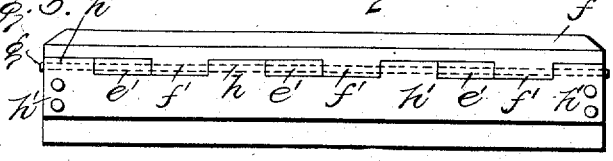

Of the accompanying drawings, forming a part of this specification, Figure 1 represents a perspective view of an inking appliance embodying my invention without the absorbent pad, the latter being removed and the hinged clamping-frame and cover being open. Fig. 2 represents a sectional view of the apparatus in the condition shown in Fig. 1. Fig. 3 represents a sectional view showing the pad in place and the clamping-frame in position to secure the pad, the cover being closed. Fig. 4 represents a side view of the pad detached, a part of the cloth covering of the pad being broken away. Fig. 5 represents a section on line 5 5 of Fig. 4. Fig. 6 represents a back view of the appliance, showing the hinge members which connect the clamping-frame and cover with the base or holder.

The same letters of reference indicate the same parts in all the figures.

In the drawings, *a* represents a base or holder, which is preferably formed as a shallow box open at the top. In the cavity of the holder *a* is inserted a sheet-metal ink-reservoir *b*, the depth of which is such that the top of the reservoir, which is flat, is substantially flush with the upper edge of the holder, so that the top of the reservoir constitutes a support for the inking-pad *c*, hereinafter described.

*d* represents a wick, the main portion of which is located within the reservoir *b*, said wick extending upwardly through a hole formed for its reception in the central portion of the top of the reservoir, the upper end of the wick projecting above the said top, so that when the pad is laid upon the reservoir its under side is in contact with the upper end portion of the wick. The ink which is raised by the capillary action of the wick is therefore delivered continuously by the wick to the under side of the pad, the pad absorbing the ink which is spread throughout the pad by capillary action in the latter. To facilitate the distribution of the ink by the wick, I spread the upper end of the wick upon the top of the reservoir, as indicated in Figs. 1, 2, and 3, the spread of the wick being conveniently accomplished by unraveling the fibers at the upper end of the wick and causing said fibers to radiate and form a flattened rosette *d'*.

The pad *c* is preferably composed of one or more layers 2 of felt and a bag 3, of suitable textile fabric, inclosing the felt layer or layers 2. The bag is of rectangular form and is closed along each of its edges, the interior pad thus constructed being of such form and dimensions as to cover and conform to the shape of the top of the reservoir *b*. I prefer to provide the pad with a marginal wire frame 4, which is located within the bag and surrounds the felt layer, the said wire frame preventing the pad from being wrinkled or folded.

I have found that an absorbent pad laid upon a reservoir from which extends a wick, the upper end of which is formed into a flattened rosette lying upon the top of the reservoir, absorbs a moderate quantity of ink from the wick, the quantity being sufficient to properly ink a stamp pressed against the upper surface of the pad without being excessive, and therefore without daubing the stamp.

I am aware that it has been proposed to place an absorbent pad on a piece of perforated sheet metal forming the top of an ink-reservoir, the ink rising simultaneously through a large number of perforations into contact with the pad. I am also aware that a shallow tank or tray provided with a filling of felt to absorb a large quantity of ink has been used as a support for an absorbent pad against which a stamp is to be pressed, the said pad resting upon the felt in the tray. With either of the above-described arrangements, however, the pad is liable to be oversaturated with ink, so that the stamp is liable to be daubed, and wasteful evaporation is liable to occur from the upper surface of the pad. These objections I overcome by the above-described provision for conducting ink in a limited quantity from the reservoir through a relatively small wick which extends above the reservoir and is in contact with the under surface of the pad.

The pad is not permanently attached to or connected with the base or holder, but is held in place thereon when in use by a clamping-frame *e*, which is hinged at one edge to the base and is provided with a marginal clamping portion 6, formed to bear upon the marginal portion of the upper side of the pad to hold the latter down upon the base, and flanges 7 7 7 7 extending substantially at right angles with the clamping portion 6 and formed to bear upon the edges of the pad to prevent edgewise displacement of the latter.

In assembling the parts the frame *e* being raised, as shown in Figs. 1 and 2, the pad may be conveniently placed in the frame, its upper surface bearing against the clamping portion 6 and its edges against the inner side of the flanges 7. The frame, with the pad, may now be swung downwardly until the pad rests upon the top of the base, the edges of the flanges 7 resting upon the upper edge of the base or holder *a*. The frame is preferably provided with a catch 9, adapted to engage a stud or pin 10 on the base or holder *a*.

It will be seen that the pad is adapted to be detachably secured by the above-described means, so that it can be readily removed when worn and can be inverted when one side becomes worn to enable the unworn side to be exposed as the inking-surface. Furthermore, the raising or removal of the pad affords access to the wick to enable it to be spread out more or contracted or pulled up or pushed down to adjust it so that it will feed the ink in just the desired quantity. It also enables a pad to be used of the full size or area of the top of the reservoir, and yet permits of ready access to said reservoir for such purposes as filling through a suitable opening.

The construction of the hinged frame for clamping the pad in place, the latter being adapted to rest loosely on the reservoir when the frame is turned back, enables the pad to be reversed without handling it in such way as might ink the fingers. Such reversal may be accomplished by turning the hinged frame way back, holding the pad down meanwhile, if necessary, by a pin or match-stick. Then the latter device may be used to push or slide the pad back on the turned-back frame, and then the frame, with the pad, may be swung back to closed position, thus effecting the reversal of the pad without touching it with the fingers.

*f* represents a lid or cover which is hinged to the base and is formed to cover the pad and the clamping-frame *e*. The cover and frame are both preferably connected with the base by means of a single elongated hinge-rod or pintle *g*, passing through eyes *h h*, formed on a metal strip *h'*, affixed to the base or holder *a*, and through eyes *f'*, formed on the cover *f*, and also through eyes *e'*, formed on the frame *e*.

I claim—

1. An inking appliance comprising a base or holder, an ink-reservoir in said holder having a flat pad-supporting top, a wick extending upwardly from the interior of the reservoir, through a hole in the top thereof, the delivering end of the wick being above said top, and an absorbent pad bearing on the top of the reservoir and in contact with the delivering end of the wick, means being provided whereby the pad may be raised to afford access to the wick.

2. An inking appliance comprising a base or holder, an ink-reservoir in said holder having a flat pad-supporting top, a wick extending upwardly from the interior of the reservoir through a hole in said top, the upper portion of the wick being spread upon the top of the reservoir to distribute the ink raised by the capillary action of the wick, and an absorbent pad bearing on the top of the reservoir, in contact with the distributing portion of the wick, means being provided whereby the pad may be raised to afford access to the wick.

3. An inking appliance comprising a base or holder, an ink-reservoir in said holder having a flat pad-supporting top, a wick extending upwardly from the interior of the reservoir, through said top, an absorbent pad resting on the top of the reservoir in contact with the wick, and a frame hinged to the holder and having a marginal clamping portion formed to bear on the margin of the upper side of the pad to hold the latter down upon the reservoir, and flanges extending substantially at right angles with said clamping portion, and bearing against the edges of the pad to prevent edgewise displacement of the latter, the said hinged frame permitting the pad to be raised to afford access to the wick.

4. An inking appliance comprising a base or holder, an ink-reservoir therein, a hinged frame having a removable and reversible pad resting loosely on the top of the reservoir, and means for conducting ink from the reservoir to the under side of the pad.

5. An inking appliance comprising a base or holder, a pad resting loosely on the top of the base, and a marginal clamp hinged to the holder and adapted to confine the pad in place, the displacement of said clamp permitting the removal and reversal of the pad, the top of the base being exposed when the pad is removed.

6. An inking appliance comprising a base or holder, a loose pad adapted to rest on the top of the base, and a marginal clamping-frame hinged to the base and having a clamping portion adapted to bear on the margin of the outer surface of the pad, and flanges adapted to bear on the edges of the pad to prevent edgewise displacement of the latter.

In testimony whereof I have affixed my signature in the presence of two witnesses.

JESSE I. LITCHFIELD.

Witnesses:
C. F. BROWN,
E. BATCHELDER.